Aug. 12, 1958     G. COWPER     2,847,268
PULSE AMPLITUDE DISTRIBUTION RECORDER
Filed May 25, 1955     2 Sheets-Sheet 1

INVENTOR
George Cowper
BY W. R. Meredith
ATTORNEY 2,847,268

PULSE AMPLITUDE DISTRIBUTION RECORDER

George Cowper, Deep River, Ontario, Canada, assignor to the United States of America as represented by the United States Atomic Energy Commission Application May 25, 1955, Serial No. 510,930

3 Claims. (Cl. 346—14)

This invention relates to a device for automatically recording pulse amplitude distribution received from a counter or the like, so that a permanent record may be rapidly obtained.

There are numerous devices for separating pulses according to their amplitudes, and apparatus for counting the number of pulses of pre-selected amplitudes is known in the art.

Conventional apparatus is disadvantageous in that it is necesasry for the expermineter to labouriously write down the count of pulses of each amplitude, and plot the results as a graph or "histogram."

Various proposals have been put forward for automatically recording the number of pulses of each amplitude, but such proposals to date have involved unbelievably cumbersome apparatus, and as a result the conventional practice is still to manually write down the counted pulses and plot the results manually.

It is a principal object of the present invention to plot directly pulse amplitude distribution by means of relatively simple apparatus.

Other objects will be apparent to those skilled in the art from an examination of the present specification and the accompanying drawings.

Figure 1:
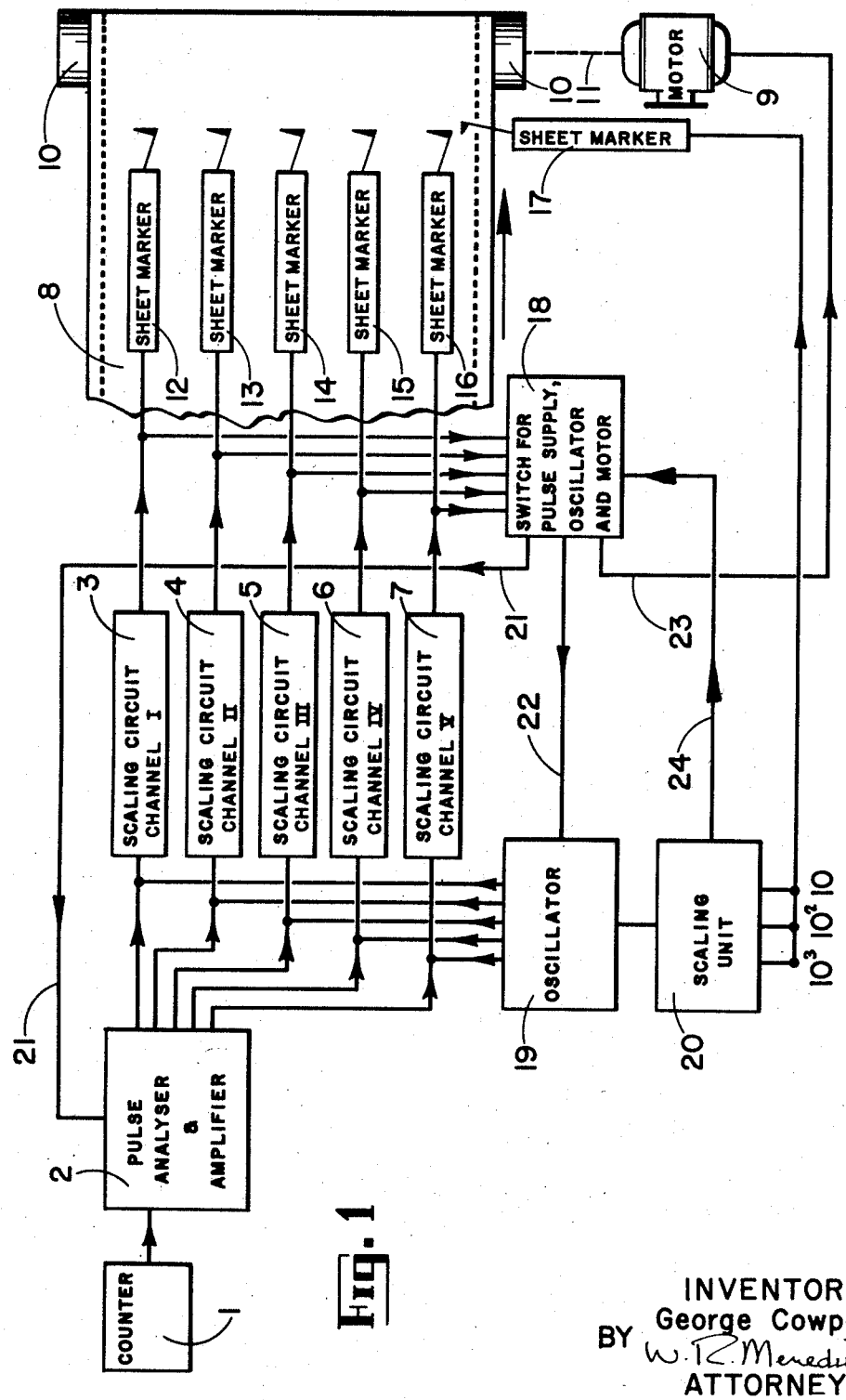
Figure 2:
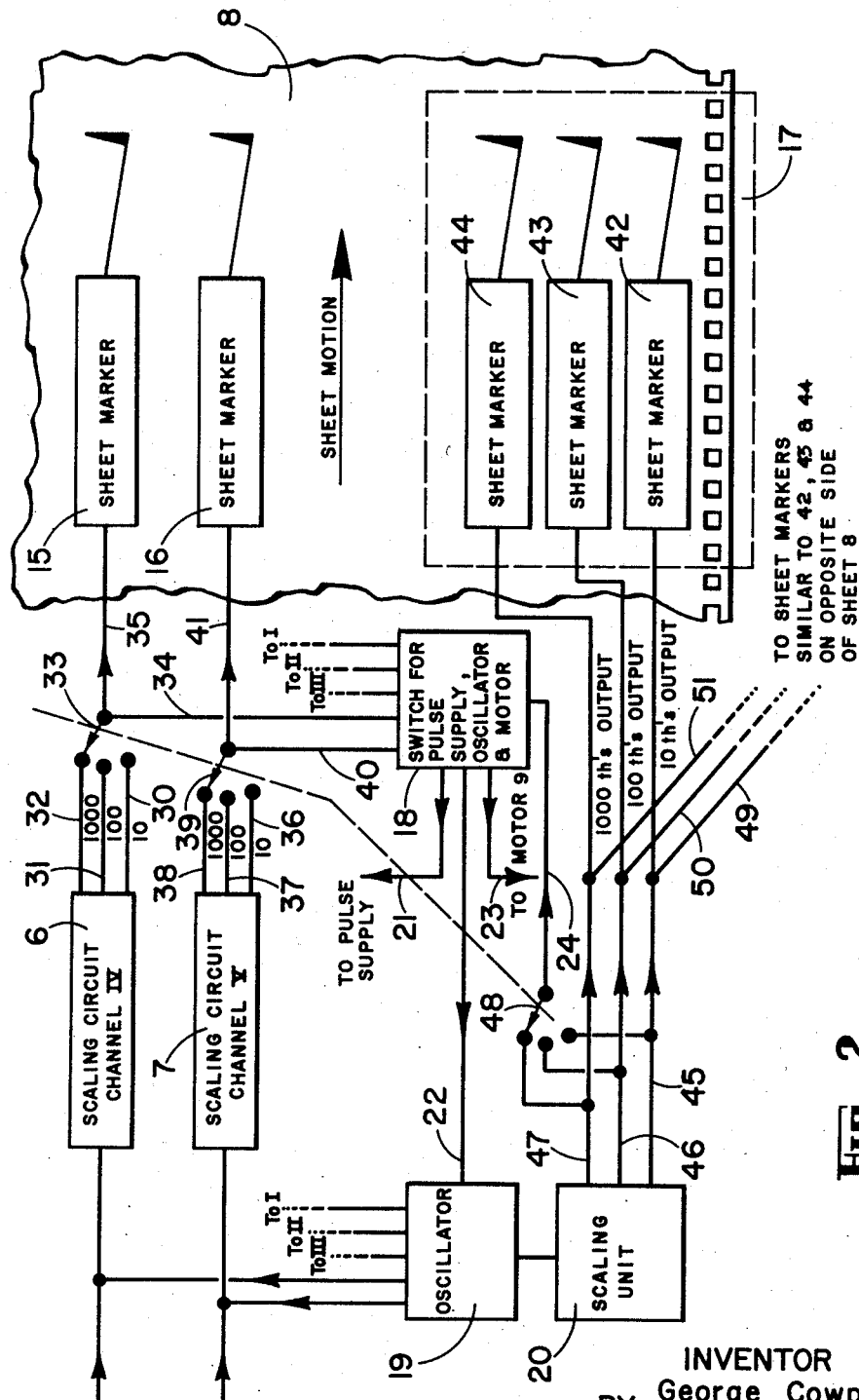

The invention will now be described with the assistance of the accompanying drawings wherein, Figure 1 shows in block diagram form a preferred embodiment of the invention; and Figure 2 shows in greater detail a part of Figure 1.

The individual components of the embodiment shown and described are conventional, and the invention resides in the new and improved combination thereof; accordingly, it is unnecessary to describe the details of the components to any greater degree than is necessary to disclose their function.

Referring first to Figure 1, a source of pulses such as a counter is shown at 1, and the remainder of the apparatus classifies the pulses from counter 1 according to their amplitude, and plots a histogram of the pulse distribution.

The pulses from counter 1 are fed to a combined pulse amplifier and analyser denoted by 2, and referred to herein as pulse analyser 2. Pulse analyser 2 is quite conventional along with the other components of the present apparatus and has a plurality of outputs, one for each pulse distribtuion which it is desired to record. While five outputs are shown, it will be appreciated that there could be any practical number depending on the degree of differentiation of pulse amplitude required.

For convenient reference, the separate paths connected to the various outputs of pulse analyser 2 are denoted as "channels," the uppermost path being denoted as channel I, and the succeeding outputs as channels II–V respectively.

The various outputs of pulse analyser 2 are applied to scaling circuits denoted by reference numerals 3—7, and for assistance in identification the channel associated with each of the scaling circuits 3—7 is identified thereon.

A combination of a counter, pulse analyser and scaling circuits such as are denoted by reference numerals 1—7 are quite conventional, and it has been heretofore necessary for an operator to write down the number of counts accumulated in each of the scaling circuits and to manually record the same by plotting the counts accumulated in each channel against the channel number.

The present device automatically plots the pulse distribution on a movable sheet of paper or the like denoted by 8, which is pulled in a right-hand direction by means of a motor denoted by 9 connected to a drum denoted by 10 through a mechanical linkage denoted by 11. Linkage 11 may be either a direct linkage or may be in the form of a suitable geared connection. As will be apparent below, it may be desirable to operate the drum 10 at two or more different speeds, and a suitable gearing arrangement may be provided to suit the particular adaptation of the device.

It will be realized that the plotting apparatus is capable of considerable variation, and this particular aspect of the preferred embodiment as well as others are given by way of example and not by way of limitation.

It is important to note that the sheet 8 does not move while counting is taking place in scaling circuits 3—7. It is contemplated that a count will take place for a certain period of time, during which period each of the scaling circuits 3—7 will accumulate a certain count. At any desired time, the pulses received from pulse analyser 2 may be cut off, and a known number of pulses from an oscillator will then be fed into each of scaling circuits 3—7 until each has reached its capacity. It is during this second step of the operation that the motor 9 is caused to operate and the sheet 8 to be moved.

During the second step of the operation, each of scaling circuits 3—7 will reach its capacity, because of the pulses fed in, and as each scaling circuit reaches its capacity a pen associated with each channel will be caused to make a mark on sheet 8 at such instant of time, and for this purpose a plurality of pens are provided denoted as sheet markers 12—16, one for each of the channels I—V. The exact form of marking is a matter of considerable variation but it will be assumed for purposes of illustration that sheet markers 12—16 are in the form of electrically-operated pens and the arrows at the right-hand side of each of the sheet markers 12—16 indicate the position of such pens. Marking by contact point on electrosensitive paper has been found satisfactory, and has been used in practicing the present invention.

It is also contemplated that calibrating marks will be made on sheet 8, and for this purpose an additional sheet marker denoted by 17 is provided. As already mentioned, it is contemplated that after a certain number of counts have been received by the scaling circuits 3—7 the pulses will be cut off and a known number of pulses applied. An oscillator denoted by 19 is provided for the purpose of supplying the pulses just referred to. As has been mentioned, the count may be terminated at any particular time, and the pulses from oscillator 19 may then be fed in to clear the count recorded in each of scaling circuits 3—7. It will be apparent that the count must not be continued beyond the capacity of any of scaling circuits 3—7 as otherwise an incorrect pulse distribution would be indicated. For example, if each of the scaling circuits 3—7 has a capacity of $10^5$ counts, and scaling circuit 5 reaches its capacity while others of the scaling circuits have not, further pulses received will have the effect on scaling circuit 5 of restoring its count to zero while some of the other scaling circuits will accumulate additional counts. Obviously this will make the results completely misleading.

Accordingly, it is contemplated that when any of the scaling circuits 3—7 has reached its capacity, that the incoming pulses will be cut off, and pulses from oscillator 19 substituted in order to clear each of scaling circuits 3—7. For this purpose a switch denoted by 18 is provided. Switch 18 is connected to each of the channels I—V, and when any one of the scaling circuits 3—7 has reached its capacity, a pulse will be transmitted to switch 18 which will simultaneously act on pulse analyser 2 through line 21 so as to cut off incoming pulses, will start oscillator 19 through line 22 and will start motor 9 through line 23.

There are many forms of multiple switches making use of relays which will achieve the function mentioned in connection with switch 18, and switch 18 need not be further described.

When switch 18 operates as mentioned above oscillator 19 feeds in pulses to scaling circuits 3—7, and the number of pulses fed in will conveniently be the same as the capacity of the scaling circuits 3—7. The reason for this is that to cover the limiting condition where one of scaling circuits 3—7 had not received any counts, feeding in pulses from oscillator 19 equal to the capacity of such scaling circuit would clear the scaling circuit.

Accordingly, a scaling unit is provided which counts the pulses generated in oscillator 19 so that it provides only a number of pulses equal to the capacity of the scaling circuits 3—7. Scaling unit 20 is similar in construction to scaling circuits 3—7 and when the predetermined number of counts has been received, a pulse is delivered by scaling unit 20 through line 24 to switch 18, and switch 18 operates to simultaneously stop oscillator 19 and stop motor 9.

It will be seen that the operation just described is not a complete re-setting of switch 18 because the supply of pulses to scaling circuits 3—7 has not been restored. Whether scaling unit 20 will completely or only partly reset switch 18 depends on the circumstances. If a single histogram were to be plotted, the operation as described would be used, whereas if a series of histograms were desired in succession, switch 18 would be arranged so as to be completely reset by a pulse from scaling unit 20, and both are contemplated by the present invention.

Scaling unit 20 also forms part of the apparatus for calibrating sheet 8 through sheet marker 17, and it is contemplated that scaling unit 20 will have several outputs shown at the lower part thereof: an output for every 10, $10^2$, and $10^3$ pulses. Sheet marker 17 will cause a mark to be made on sheet 8 at every ten pulses, and in order to indicate which marks correspond to the tenth, hundredth, thousandth etc. pulses, marks of different character may be provided, as will be described below.

Referring now to Figure 2 where greater detail of part of Figure 1, is shown, counter 1, pulse analyser 2 and channels I—III are omited, in order to simplify the drawing.

It is obviously convenient to be able to selectively obtain output pulses from scaling circuits 3—7 after every 10, $10^2$ and $10^3$ pulses, and in practice an output from each scaling circuit is preferably provided.

In Figure 2, scaling circuit 6 has three outputs on lines denoted by 30, 31 and 32 for the tenth, hundredth and thousandth pulses, respectively. A switch denoted by 33 is capable of selectively connecting switch 18 to the desired output line of scaling circuit 6, and connection is made to switch 18 by a line denoted by 34. Line 34 is connected to sheet marker 15 by a line denoted by 35 so that the output selected by switch 33 will also be applied to sheet marker 15.

A similar arrangement is provided for the other channels, only the details of channels IV and V being illustrated in Figure 2. Channel V has corresponding components to those previously described in connection with channel IV, namely three output lines denoted by 36, 37 and 38, a switch denoted by 39, a line denoted by 40 connecting to switch 18 and a line denoted by 41 connecting to sheet marker 16.

Sheet marker 17 was shown as a single marker in Figure 1 and it was mentioned that marker 17 is capable of making marks of different character to indicate the hundredth, thousandth etc. pulses. In practice this may be accomplished by three or more separate markers denoted by 42, 43 and 44 and similar markers may be provided on the opposite side of sheet 8 for obtaining the ordinates of the histogram, but the drawing does not show the latter markers. Markers 42, 43 and 44 may mark the tenths, hundredths and thousandth pulses respectively.

In practice scaling unit 20 preferably has three outputs similar to scaling circuits 6 and 7, and such outputs are on lines denoted by 45—47 for the tenths, hundredths and thousandth pulses respectively. The selected final pulse which operates switch 18 is selected by a switch denoted by 48.

When the first ten pulses have been received by scaling unit 20, a pulse is transmitted to sheet marker 42 and a mark is made on the edge of sheet 8. After one hundred pulses, a pulse is transmitted to sheet marker 43 and a mark is made, similar to the mark made by sheet marker 42 except farther away from the adjacent edge of sheet 8. Sheet marker 44 makes a similar mark, but still farther away from said edge. It will be seen that the marking means of all of sheet markers 15, 16, 42, 43 and 44 are in line with one another, but it is possible that if sheet 8 were distorted the marking would be also distorted. Accordingly, sheet markers similar to 42—44 on the oposite side of sheet 8 (not shown) produce tenth, hundredth and thousandth marks which will enable ordinates to be drawn in later with considerable accuracy. Lines denoted by 49—51 are connected to lines 45—47 respectively, so that the markers similar to sheet markers 42—44 receive similar simultaneous signals.

If switches 33 and 39 are set so that a pulse is delivered to sheet markers 15 and 16 after 1000 counts have been received, it should also be arranged that scaling unit 20 will cause switch 18 to be operated to shut off oscillator 19 and motor 9 after a similar number of pulses. Accordingly switch 48 is selectively connected to the appropriate line 45—47. Switches 33, 39 and 48 may be ganged for convenience if desired.

The operation of the device will be apparent from the foregoing, but for greater certainty will now be reiterated.

By virtue of the selectivity of switches 33 and 39, and similar switches (not shown), the pulse distribution may be automatically recorded on sheet 8 when one of the scaling circuits 3—7 reaches either full or partial capacity as selected by switches such as switch 33.

It will be assumed that pulses are being received from counter 1 and that these are being analysed, amplified and distributed according to amplitude by pulse analyser 2. Pulses of various amplitudes will then be applied to the different channels, and scaling circuits 3—7 will each accumulate a certain count.

For purposes of illustration, it will be assumed that scaling circuit 4 receives more counts than scaling circuits 3 or scaling circuits 5—7 although the channel receiving the most pulses will vary from experiment to experiment. At a certain time scaling circuit 4 having received the most pulses reaches its capacity, and at this point a pulse is delivered at the output of scaling circuit 4 and switch 18 is caused to operate. Switch 18 simultaneously cuts off the pulses through line 21, starts oscillator 19 and starts motor 9.

It has been assumed that one scaling circuit (4) reached its capacity first, but if more than one of scaling circuits 3—7 should reach capacity at the same time, the procedure described will not be changed.

At the instant just referred to when scaling circuit 4 has reached its capacity, the pulse which operated switch 18 will also have operated sheet maker 13 and a mark will have been made on sheet 8 just at the instant before sheet 8 begins to move in a right-hand direction.

At the same time, scaling unit 20 will begin to count the pulses from oscillator 19, and after 10 counts have been generated by oscillator 19, a mark will be made on sheet 8 by means of sheet marker 17.

The operation described will continue and as each of the scaling circuits 3 and 5—7 reaches its capacity, a mark will be made on sheet 8 by the appropriate sheet marker 12 and 14—16. Meanwhile sheet marker 17 will be making the calibrating marks on sheet 8 as it moves, and the calibrating marks will be distinguishable by their distance from the edge of sheet 8 as mentioned above. It is important to note that after the first scaling circuit has reached its capacity (in this case scaling circuit 4) and a pulse is delivered at the output, such output does not affect the switch 18, and the operation continues until oscillator 19 has delivered the predetermined number of pulses, as determined by the capacity (either ultimate or selected) of scaling unit 20. When scaling unit 20 has reached its capacity, a pulse is delivered on line 24 which restores the switch 18 to its initial position, or else shuts off the apparatus entirely, whichever may be desired.

The sheet 8 will now have a number of points plotted thereon, one for each of the channels, and referring these to the calibrating marks produced by sheet marker 17 the count which had accumulated in each of scaling circuits 3—7 at the time that scaling circuit 4 reached its capacity will be graphically shown in the form of a complete histogram.

The embodiments of the invention in which an exclusive property or privilege is claimed are defined as follows:

1. Apparatus for recording pulse amplitude distribution of a sequence of pulses comprising means separating said pulses into individual groups according to amplitude; individual scaling means, each capable of counting the same number of pulses, counting the pulses in each of said groups; means for generating a number of timed pulses equal to said same number of pulses; means operable responsive to any one of the scaling means counting said same number of pulses for starting said generator means and simultaneously applying said timed pulses to all of said scaling means and cutting off the separated pulses to all of said scaling means; means indicating the difference in time between when the first scaling means counts said same number of pulses and when each of the other scaling means counts said same number of pulses.

2. Apparatus for recording pulse amplitude distribution of a sequence of pulses comprising means separating said pulses into individual groups according to amplitude; individual scaling means, each capable of counting the same number of pulses, counting the pulses in each of said groups; means for generating a number of timed pulses equal to said same number of pulses; means operable responsive to any one of the scaling means counting said same number of pulses for starting said generator means and simultaneously applying said timed pulses to all of said scaling means and cutting off the separated pulses to all of said scaling means; means recording the difference in time between when the first scaling means counts said same number of pulses and when each of the other scaling means counts said same number of pulses.

3. A device for recording upon a surface the distribution of pulses according to amplitude, comprising analyzing means for receiving a sequence of pulses and separating said pulses into groups appearing at individual outputs according to amplitude; a plurality of first scaling devices each individually connected to a different one of said outputs of said analyzer means and operable responsive to the counting of a specific number of applied pulses to generate a scaler output signal; a plurality of marking means aligned along the dimension of said surface transverse to the direction of movement of said surface, each marking means individually connected to the output of a different one of said first scaling devices and making a mark on said surface responsive to the production of an output signal by its associated first scaling device; motive means for driving said surface, an oscillator selectively connected to the input of each of said scaling devices and applying pulses thereto; a second scaling device connected to said oscillator and counting the pulses generated by said oscillator; calibrating sheet marking means aligned with said marking means and connected to the output of said second scaler for making calibrating marks on said surface in response to specified output signals applied thereto from said second scaler; switching means connected to the outputs of said first scaling devices and to said oscillator operating simultaneously, responsive to production of the first scaler output signal, to disconnect said pulse analyzer from said first scaler inputs, to initiate operation of said oscillator to apply pulses from said oscillator to said first scaling devices and to initiate the operation of said motive means, said switching means also being operatively connected to the said second scaling device and operable responsive to application of said specific number of pulses by said oscillator to said first scaling devices to cut off the pulses from said oscillator and de-energize said motive means.

References Cited in the file of this patent
UNITED STATES PATENTS

| | | |
|---|---|---|
| 2,596,118 | Bischoff et al. | May 13, 1952 |
| 2,639,209 | Gamarekian | May 19, 1953 |
| 2,651,963 | Bischoff | Sept. 15, 1953 |